No. 825,562. PATENTED JULY 10, 1906.
J. L. TORBETT.
DRAG SCRAPER.
APPLICATION FILED OCT. 4, 1905.
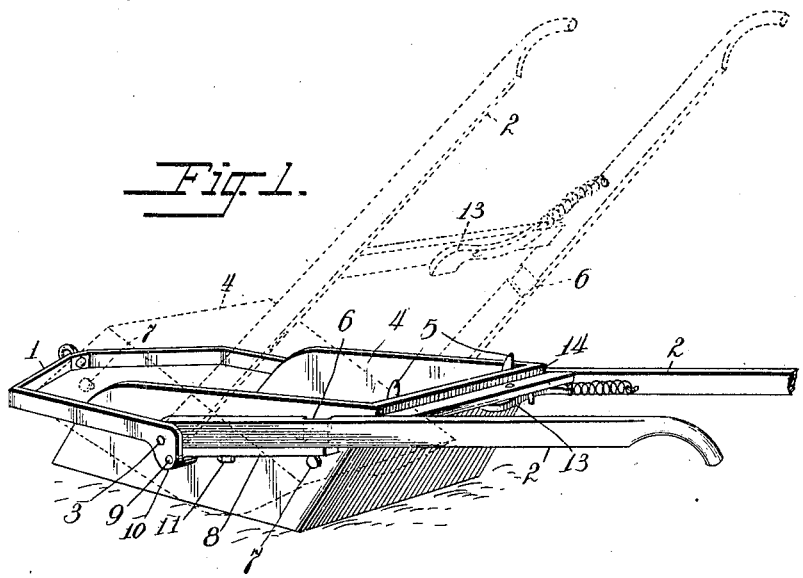
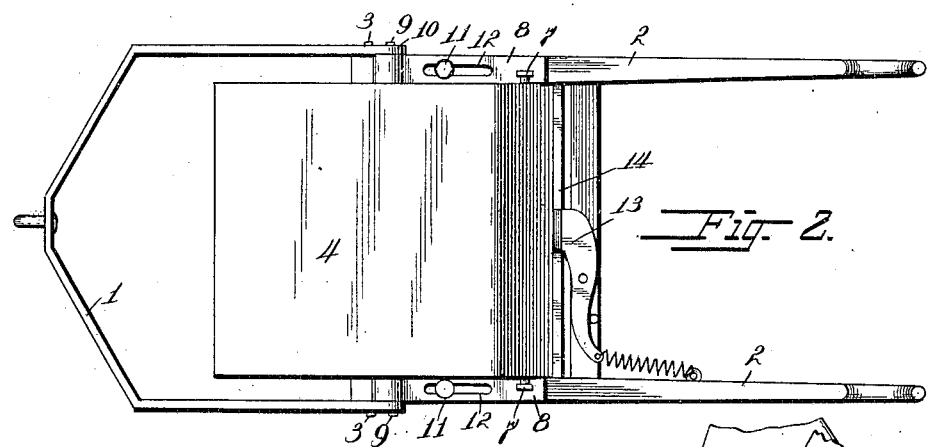
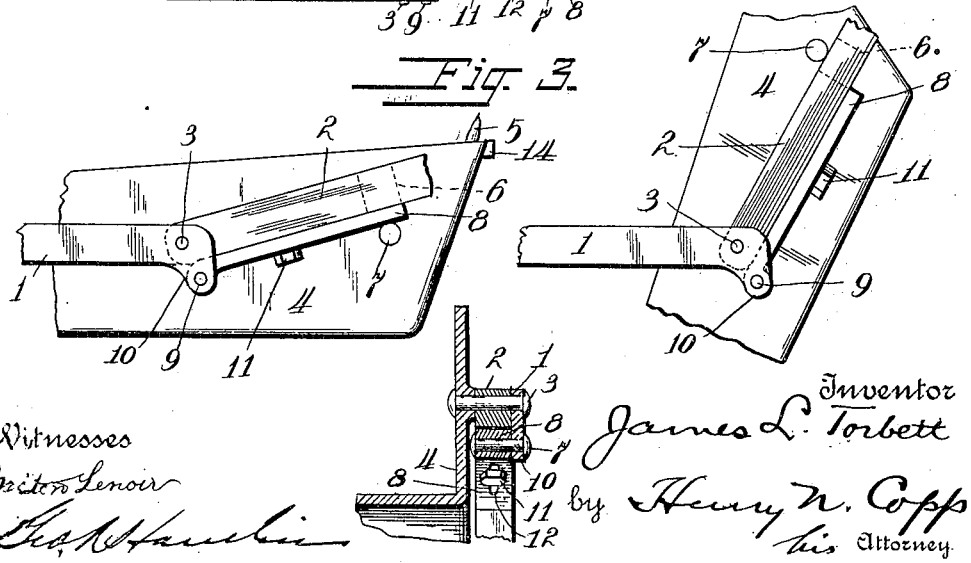

UNITED STATES PATENT OFFICE.

JAMES L. TORBETT, OF PLEASANTON, KANSAS, ASSIGNOR OF ONE-HALF TO JOHN F. CARSON, OF PLEASANTON, KANSAS.

DRAG-SCRAPER.

No. 825,562.     Specification of Letters Patent.     Patented July 10, 1906.

Application filed October 4, 1905. Serial No. 281,309.

*To all whom it may concern:*

Be it known that I, JAMES L. TORBETT, a citizen of the United States, residing at Pleasanton, county of Linn, and State of Kansas, have invented certain new and useful Improvements in Drag-Scrapers, of which the following is a specification.

This invention relates to drag-scrapers.

The object of the present invention is the provision of an improved drag-scraper having means whereby the mere raising of the handles will automatically release the scoop and the latter will automatically dump itself as the scraper advances and thereafter become locked in scraping position.

To carry out the foregoing object, I provide certain improved devices which are set forth fully hereinafter and the novel features thereof are recited in the appended claims.

In the accompanying drawings, Figure 1 is a perspective, dotted lines showing the handle-frame raised and the scoop starting to dump. Fig. 2 is a bottom view; Fig. 3, enlarged detail views of the automatic locking mechanism and parts of the scoop, handles, and yoke, illustrating the different positions of the parts.

The yoke to which the horse is hitched is shown at 1, and 2 represents the handle-frame, which is pivoted to the yoke 1 at 3, so as to be adapted to be swung up and down, as desired. The scoop 4 is pivoted on the pivots 3, so as to be capable of swinging in the handle-frame 2 and yoke 1, said scoop having pins or points 5 on the upper edge of its back. The side pieces of the handle-frame 2 have their inner surfaces cut out or notched at 6 for the free passage of stop-pins 7 on opposite sides of the scoop; but the notches 6 are normally covered by sliding gates 8, whose forward ends are pivoted at 9 to the downward extensions 10 of the rear ends of the yoke 1. These gates are guided by headed pins 11, entered in the handle-frame 2 and passing through slots 12 in the gates. A spring-actuated latch 13, pivoted to the under side of the handle-frame, is adapted to engage a notched member 14 on the back of the scoop and lock the latter against backward turning or reversal.

When the scraper is in normal condition or at work, the latch 13 is in engagement with member 14 and the gates 8 cover the notches 6, the stop-pins 7 resting against the under sides of said gates 8. When it it desired to dump the scoop, the operator swings the handle-frame on its pivots 3 to the upright position shown in dotted lines in Fig. 1, and as the yoke remains in its former position this movement causes an uncovering of the notches 6, as illustrated in Fig. 3. The latch 13 causes the scoop to move upwardly with the handle-frame when the latter is raised, thereby causing the toe of the scoop to dig into or engage the ground, so that when the openings or notches 6 are uncovered the stop-pins 7 are released and pass through notches 6, permitting the scoop to turn upside down as the horse advances, until the pins 5 engage the ground and cause a complete reversal and dumping of the scoop. The handle-frame should be held raised by the operator until the scoop has reversed, and it should then be brought down to normal position to cause the gates 8 to again cover the notches 6, so that when the scoop comes to normal position the stop-pins 7 will bring up against the lower side of gates 8. When the scoop reaches normal position, the latch 13 reëngages member 14. The dumping and relocking of the scoop is entirely automatic, save for the mere raising and lowering of the handle-frame by the operator, which is a very simple and easy operation.

Having thus described my invention, what I claim as new, and desire to secure by Letters Patent, is—

1. A scraper, comprising a yoke, a handle-frame pivoted to the yoke, a pivoted reversible scoop, and means for retaining the scoop in normal position, said means coöperating with the handle-frame and being adapted for the release and locking of the scoop by raising and lowering the handle-frame.

2. A scraper, comprising a yoke, a handle-frame pivoted to the yoke, a reversible scoop pivoted to the handle-frame, and scoop locking and releasing means carried by the yoke and coöperating with the handle-frame so that raising and lowering the handle-frame unlocks and locks the scoop.

3. A scraper, comprising a yoke, a handle-frame pivoted to the yoke, a pivoted reversible scoop, and means for locking the scoop, said means being pivotally connected to the yoke at a point offset from the point of pivoting of the yoke and handle-frame, said locking means coöperating with said handle-frame, whereby raising or lowering the handle-frame unlocks or locks the scoop.

4. A scraper, comprising a yoke, a handle-frame pivoted to the yoke, a pivoted reversible scoop, stop-pins on the scoop, and locking-gates pivoted to the yoke at a point offset from the point of pivoting of the yoke and handle-frame and slidably connected to the handle-frame and adapted to engage the stop-pins when the scoop is in normal position but disengaged therefrom by raising the handle-frame.

In testimony whereof I hereuno affix my signature in presence of two witnesses.

JAMES L. TORBETT.

Witnesses:
W. P. CONKEY,
J. F. CARSON.